United States Patent
Oho et al.

(10) Patent No.: US 10,747,194 B2
(45) Date of Patent: Aug. 18, 2020

(54) MOTOR CONTROL DEVICE AND MOTOR CONTROL METHOD

(71) Applicant: FANUC CORPORATION, Yamanashi (JP)

(72) Inventors: Yusaku Oho, Yamanashi (JP); Kazunori Iijima, Yamanashi (JP)

(73) Assignee: FANUC CORPORATION, Yamanashi (JP)

(\*) Notice: Subject to any disclaimer, the term of this patent is extended or adjusted under 35 U.S.C. 154(b) by 0 days.

(21) Appl. No.: 16/127,230

(22) Filed: Sep. 11, 2018

(65) Prior Publication Data
US 2019/0079487 A1    Mar. 14, 2019

(30) Foreign Application Priority Data
Sep. 12, 2017    (JP) ................................. 2017-175040

(51) Int. Cl.
*G05B 19/404*    (2006.01)
*G05B 19/23*    (2006.01)
(Continued)

(52) U.S. Cl.
CPC ............ *G05B 19/404* (2013.01); *G05B 11/36* (2013.01); *G05B 19/232* (2013.01);
(Continued)

(58) Field of Classification Search
CPC ............. G05B 19/232; G05B 19/4141; G05B 19/404; G05B 11/36
See application file for complete search history.

(56) References Cited

U.S. PATENT DOCUMENTS

2005/0007045 A1\* 1/2005 Kinukawa ................ H02P 6/16
318/400.22
2012/0312114 A1 12/2012 Deegan
(Continued)

FOREIGN PATENT DOCUMENTS

DE    265986 A1    3/1989
DE    4141897 A1    6/1993
(Continued)

OTHER PUBLICATIONS

Manfred Weck et al., "Werlczeugmaschinen 3—Mechatronische Systeme, Vorschubantriebe, Prozessdiagnose", 1995, 94p to 96p(D7), Springer Vieweg, Berlin, Heidelberg, Germany, 7pp.

*Primary Examiner* — Muhammad S Islam
(74) *Attorney, Agent, or Firm* — Hauptman Ham, LLP

(57) ABSTRACT

A motor control device capable of promptly positioning a driven object at a target position, while suppressing backlash. The motor control device includes an operation command generation section for generating a first operation command and a second operation command for first and second motors to move the driven object; a preload command generation section for generating a first preload command which is added to the first operation command and a second preload command which is added to the second operation command in order that drive axes of the first motor and the second motor provide the driven object forces in opposite directions; and a preload command adjustment section for adjusting the first preload command and the second preload command in order that an absolute value of the above forces is decreased when an operation amount exceeds a predetermined threshold value.

13 Claims, 11 Drawing Sheets

(51) Int. Cl.
*G05B 11/36* (2006.01)
*G05B 19/414* (2006.01)
(52) U.S. Cl.
CPC ............... *G05B 19/4141* (2013.01); *G05B 2219/41264* (2013.01); *G05B 2219/41265* (2013.01); *G05B 2219/42062* (2013.01)

(56) References Cited

U.S. PATENT DOCUMENTS

2014/0306644 A1* 10/2014 Sakai .................. G05B 19/404 318/625
2015/0309500 A1* 10/2015 Hashimoto ............ G05B 19/19 318/630

FOREIGN PATENT DOCUMENTS

| | | |
|---|---|---|
| DE | 102009044358 A1 | 9/2010 |
| DE | 102014003439 A1 | 9/2014 |
| DE | 102014010576 A1 | 1/2015 |
| JP | 2010-236603 A | 10/2010 |
| JP | 2014-178753 A | 9/2014 |
| JP | 2014-207770 A | 10/2014 |
| JP | 2015-23708 A | 2/2015 |

* cited by examiner

MOTOR CONTROL DEVICE AND MOTOR CONTROL METHOD

RELATED APPLICATIONS

The present application claims priority of Japanese Application Number 2017-175040, filed on Sep. 12, 2017, the disclosure of which is hereby incorporated by reference herein in its entirety.

BACKGROUND OF THE INVENTION

1. Field of the Invention

The invention relates to a motor control device and a motor control method.

2. Description of the Related Art

In a motor control device which performs a control of a plurality of motors in order that the plurality of motors drive a driven object (so-called tandem control), there has been known a technique to apply a preload to the driven object so as to prevent backlash between the plurality of motors and the driven object (e.g., Japanese Unexamined Patent Publication (Kokai) No. 2014-178753). In the motor drive apparatus as described above, there has been demanded a technique to be capable of promptly positioning the driven object to a target position, while suppressing backlash as described above.

SUMMARY OF INVENTION

In an aspect of the present disclosure, a motor control device configured to control a first motor and a second motor which drive a driven object in the same direction, includes an operation command generation section configured to generate a first operation command for the first motor to move the driven object in cooperation with the second motor and a second operation command for the second motor to move the driven object in cooperation with the first motor; a preload command generation section configured to generate a first preload command to be added to the first operation command and a second preload command to be added to the second operation command in order for a drive axis of the first motor and a drive axis of the second motor to apply forces in opposite directions to the driven object; and a preload command adjustment section configured to adjust the first preload command and the second preload command so as to reduce an absolute value of the forces when an operation amount acquired from at least one of the first operation command and the second operation command exceeds a predetermined threshold value.

In another aspect of the present disclosure, a method of controlling a first motor and a second motor which drive a driven object in the same direction, includes generating a first operation command for the first motor to move the driven object in cooperation with the second motor and a second operation command for the second motor to move the driven object in cooperation with the first motor; generating a first preload command to be added to the first operation command and a second preload command to be added to the second operation command in order for a drive axis of the first motor and a drive axis of the second motor to apply forces in opposite directions to the driven object; and adjusting the first preload command and the second preload command so as to reduce an absolute value of the forces when an operation amount acquired from at least one of the first operation command and the second operation command exceeds a predetermined threshold value.

According to this disclosure, when the driven object stands still, a preload is applied to the driven object, whereby backlash is prevented. On the other hand, when an operation amount is increased so as to move the driven object, a preload applied to the driven object can be decreased. Thereby, it is possible to promptly position the driven object to a target position.

DETAILED DESCRIPTION

Figure 1:
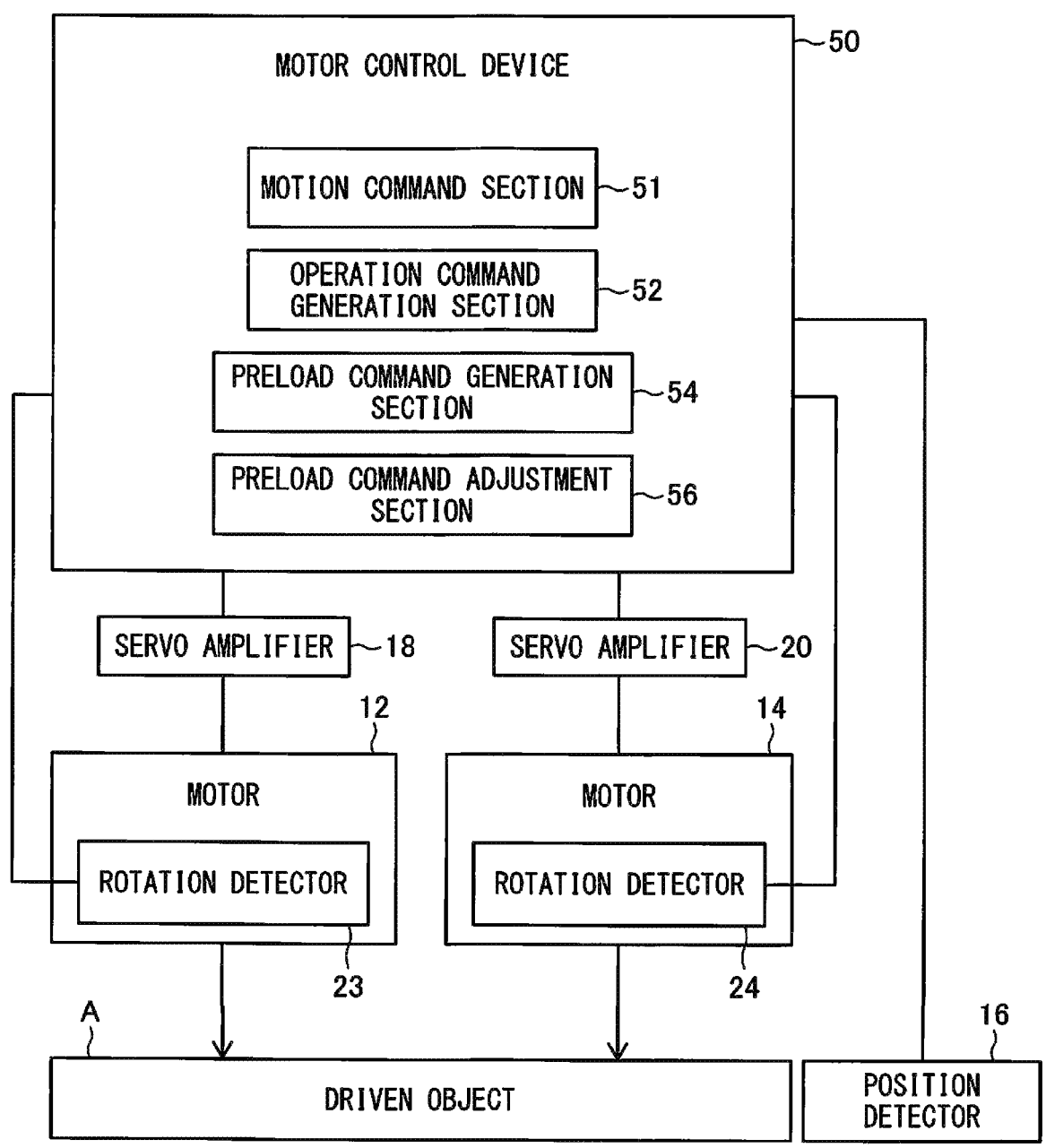
FIG. 1 is a block diagram of a motor system according to one embodiment.

Hereinafter, embodiments of the present disclosure will be described in detail with reference to the drawings. Note that, in various embodiments described below, similar elements are assigned the same reference numerals, and repetitive descriptions thereof will be omitted. First, referring to FIGS. 1 and 2, a motor system 10 according to an embodiment is described.

FIG. 1 is a block diagram schematically illustrating a function of a motor system 10. The motor system 10 includes motors 12 and 14, a position detector 16, servo amplifiers 18 and 20, and a motor control device 50.

Each of the motors 12 and 14 is e.g. a servo motor, and drives a driven object A in the same direction in cooperation with each other. The motor 12 includes a stator, a rotor rotatably supported by the stator (both not illustrated), and a rotation detector 23.

The rotation detector 23 includes e.g. an encoder or a Hall element, and detects a rotation position of the rotor of the motor 12. The rotation detector 23 acquires a rotation speed of the rotor of the motor 12 by time-differential of the acquired rotation position, and transmits it to the motor control device 50 as a speed feedback $V_{FBM}$.

The motor 14 includes a stator, a rotor rotatably supported by the stator (both not illustrated), and a rotation detector 24. The rotation detector 24 includes e.g. an encoder or a Hall element, and detects a rotation position of the rotor of the motor 14. The rotation detector 24 acquires a rotation speed of the rotor of the motor 14 by time-differential of the acquired rotation position, and transmits it to the motor control device 50 as a speed feedback $V_{FBS}$.

Figure 2:
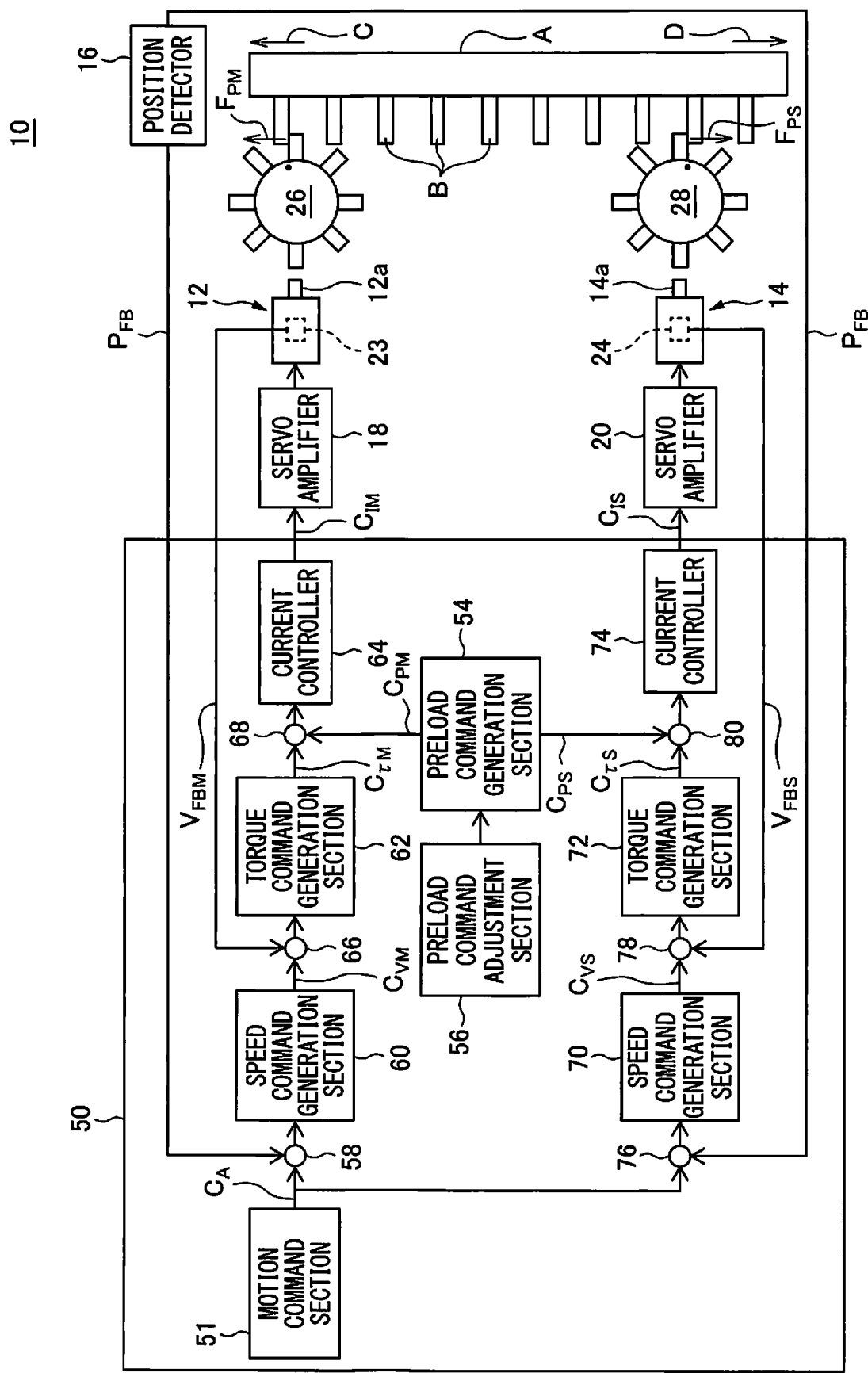
FIG. 2 is a block diagram of the motor system as illustrated in FIG. 1, which illustrates a detailed function of a motor control device.

The position detector 16 includes e.g. a linear scale, and is disposed adjacent to the driven object A (FIG. 2). The position detector 16 detects a position of the driven object A, and transmits it to the motor control device 50 as a position feedback $P_{FB}$.

The motor control device 50 is configured by a computer including at least one processor and at least one memory (RAM, ROM, etc.). The motor control device 50 includes a motion command section 51, an operation command generation section 52, a preload command generation section 54, and a preload command adjustment section 56.

The operation command generation section 52 generates an operation command $C_M$ and an operation command $C_S$. The operation command $C_M$ is transmitted to the motor 12 in order for the motor 12 to move the driven object A in a movement direction (direction C or D in FIG. 2) in cooperation with the motor 14. On the other hand, the operation command $C_S$ is transmitted to the motor 14 in order for the motor 14 to move the driven object A in the movement direction in cooperation with the motor 12.

The preload command generation section 54 generates a preload command $C_{PM}$ and a preload command $C_{PS}$. The preload command $C_{PM}$ is added to the operation command $C_M$ in order for a drive axis 12a of the motor 12 to apply a preload force $F_{PM}$ to the driven object A.

The preload command $C_{PS}$ is added to the operation command $C_S$ in order for a drive axis 14a of the motor 14 to apply to the driven object A a preload force $F_{PS}$ acting in a direction opposite the preload force $F_{PM}$ by the motor 12.

The preload command adjustment section 56 adjusts the preload command $C_{PM}$ or the preload command $C_{PS}$ so as to reduce an absolute value of at least one of the preload forces $F_{PM}$ and $F_{PS}$ when an operation amount E acquired from at least one of the operation commands $C_M$ and $C_S$ exceeds a predetermined threshold value $E_\alpha$.

Note that, the functions of these operation command generation section 52, the preload command generation section 54, and the preload command adjustment section 56 will be described later. The motor control device 50 acquires, as the operation amount E, the operation command $C_M$, the operation command $C_S$, or an acceleration α of the driven object A, the drive axis 12a or the drive axis 14a.

Next, the motor control device 50 will be further described with reference to FIG. 2. FIG. 2 is a block diagram illustrating a detailed function of the motor control device 50. The motor control device 50 includes speed command generation sections 60 and 70, torque command generation sections 62 and 72, and current controllers 64 and 74.

The motion command section 51 transmits a position command $C_A$ to each of the speed command generation sections 60 and 70. At a subtractor 58, the position feedback $P_{FB}$ transmitted from the position detector 16 is subtracted from the position command $C_A$ transmitted to the speed command generation section 60 from the motion command section 51.

The speed command generation section 60 generates a speed command $C_{VM}$ on the basis of a value obtained by subtracting the position feedback $P_{FB}$ from the position command $C_A$, and transmits it to the torque command generation section 62. At a subtractor 66, the speed feedback $V_{FBM}$ transmitted from the rotation detector 23 is subtracted from the speed command $C_{VM}$.

The torque command generation section 62 generates a torque command $C_{\tau M}$ on the basis of a value obtained by subtracting the speed feedback $V_{FBM}$ from the speed command $C_{VM}$, and transmits it to the current controller 64. At an adder 68, the preload command $C_{PM}$ generated by the preload command generation section 54 is added to the torque command $C_{\tau M}$. Thus, in this embodiment, the preload command $C_{PM}$ is generated as a torque command.

The current controller 64 generates a voltage signal $C_{IM}$ (e.g., PWM control signal) on the basis of a sum of the torque command $C_{\tau M}$ and the preload command $C_{PM}$, and transmits it to the servo amplifier 18. In this embodiment, the voltage signal $C_{IM}$ includes a torque component corresponding to the torque command $C_{\tau M}$ and a preload component corresponding to the preload command $C_{PM}$.

The servo amplifier 18 includes e.g. an inverter (not illustrated), and supplies to the motor 12 an AC power in accordance with the voltage signal $C_{TM}$, so as to drive the motor 12.

A gear 26 is coupled to the drive axis 12a of the motor 12, while engaging teeth B formed at the driven object A. Thereby, the drive axis 12a of the motor 12 applies a force to the driven object A via the gear 26, and drives the driven object A in the direction C or the direction D opposite the direction C, as illustrated in FIG. 2.

On the other hand, at a subtractor 76, the position feedback $P_{FB}$ transmitted from the position detector 16 is subtracted from the position command $C_A$ transmitted from the motion command section 51 to the speed command generation section 70. The speed command generation section 70 generates a speed command $C_{VS}$ on the basis of a value obtained by subtracting the position feedback $P_{FB}$ from the position command $C_A$, and transmits it to the torque command generation section 72.

Thus, in this embodiment, the position command $C_A$ for the speed command generation sections 60 and 70 is common, and the position feedback $P_{FB}$ transmitted to the subtractors 58 and 76 is common. Accordingly, the speed command $C_{VM}$ and the speed command $C_{VS}$ are substantially the same value. At a subtractor 78, the speed feedback $V_{FBS}$ transmitted from the rotation detector 24 is subtracted from the speed command $C_{VS}$.

The torque command generation section 72 generates a torque command $C_{\tau S}$ on the basis of a value obtained by subtracting the speed feedback $V_{FBS}$ from the speed command $C_{VS}$, and transmits it to the current controller 74. At an adder 80, the preload command $C_{PS}$ generated by the preload command generation section 54 is added to the torque command $C_{\tau S}$. Thus, in this embodiment, the preload command $C_{PS}$ is generated as a torque command.

The current controller 74 generates a voltage signal $C_{IS}$ (e.g., PWM control signal) on the basis of a sum of the torque command $C_{\tau S}$ and the preload command $C_{PS}$, and transmits it to the servo amplifier 20. In this embodiment, the voltage signal $C_{IS}$ includes a torque component corresponding to the torque command $C_{\tau S}$ and a preload component corresponding to the preload command $C_{PS}$.

The servo amplifier 20 includes e.g. an inverter (not illustrated), and supplies to the motor 14 AC power in accordance with the voltage signal $C_{IS}$, so as to drive the motor 14.

A gear 28 is coupled to the drive axis 14a of the motor 14, while engaging the teeth B formed at the driven object A. Thereby, the drive axis 14a of the motor 14 applies a force to the driven object A via the gear 28, and drives the driven object A in the same direction C or D as the motor 12. Thus, the motors 12 and 14 drive the driven object A in the direction C or D in cooperation with each other.

As described above, the motor 12 moves the driven object A in the direction C or D in accordance with the position command $C_A$, the speed command $C_{VM}$, the torque command $C_{\tau M}$, and the voltage signal $C_{IM}$ which are respectively generated by the motion command section 51, the speed command generation section 60, the torque command generation section 62, and the current controller 64. Accordingly, the position command $C_A$, the speed command $C_{VM}$, the torque command $C_{\tau M}$, and the voltage signal $C_{IM}$ constitute the operation command $C_M$.

Further, the motor 14 moves the driven object A in the same direction C or D as the motor 12 in accordance with the position command $C_A$, the speed command $C_{VS}$, the torque command $C_{\tau S}$, and the voltage signal $C_{IS}$ which are respectively generated by the motion command section 51, the speed command generation section 70, the torque command generation section 72, and the current controller 74. Thus, the position command $C_A$, the speed command $C_{VS}$, the torque command $C_{\tau S}$, and the voltage signal $C_{IS}$ constitute the operation command $C_S$.

Further, the motion command section 51, the speed command generation sections 60 and 70, the torque command generation sections 62 and 72, and the current controllers 64 and 74 constitute the operation command generation section 52 which generates the operation commands $C_M$ and $C_S$.

When the motors 12 and 14 drive the driven object A in the direction C or D in cooperation with each other, the operation commands $C_M$ and $C_S$ respectively cause the motors 12 and 14 to rotate in the same direction and with substantially the same torque.

The processor of the motor control device 50 functions as the operation command generation section 52 so as to generate the operation commands $C_M$ and $C_S$. In this case, a first processor of the motor control device 50 may function as the motion command section 51, the speed command generation section 60, the torque command generation section 62, and the current controller 64, while a second processor of the motor control device 50 may function as the speed command generation section 70, the torque command generation section 72, and the current controller 74.

Further, the processor of the motor control device 50 functions as the preload command generation section 54 so as to generate the preload commands $C_{PM}$ and $C_{PS}$.

As described above, in this embodiment, the preload command $C_{PM}$ is added to the operation command $C_M$ by being added to the torque command $C_{\tau M}$ at the adder 68. In accordance with this preload command $C_{PM}$, the drive axis 12a of the motor 12 applies to the driven object A the preload force $F_{PM}$ acting in the direction C.

On the other hand, the preload command $C_{PS}$ is added to the operation command $C_S$ by being added to the torque command $C_{\tau S}$ at the adder 80. In accordance with this preload command $C_{PS}$, the drive axis 14a of the motor 14 applies to the driven object A the preload force $F_{PS}$ acting in the direction D.

In this way, by applying the preload forces $F_{PM}$ and $F_{PS}$ acting in the directions opposite to each other, a preload is given to the driven object A so as to stretch the driven object A, whereby backlash between the gear 26 and the teeth B and between the gear 28 and the teeth B is prevented (this operation mode is so-called "anti-backlash mode").

As described above, the motor control device 50 acquires the acceleration $\alpha$, the operation command $C_M$, or the operation command $C_S$, as the operation amount E. As an example, if the acceleration $\alpha$ of the driven object A is acquired, the processor of the motor control device 50 calculates the acceleration $\alpha$ by a second-order time-differential of the position feedback $P_{FB}$ (i.e., $\alpha = d^2 P_{FB}/dt^2$) received from the position detector 16.

As another example, if the acceleration $\alpha$ of the drive axis 12a (or 14a) is acquired, the processor of the motor control device 50 calculates the acceleration $\alpha$ by a first-order time-differential of the speed feedback $V_{FBM}$ (or $V_{FBS}$) (i.e., $\alpha = dV_{FBM}/dt$ or $dV_{FBS}/dt$) from the rotation detector 23.

Since the acceleration $\alpha$ changes in response to the operation command $C_M$ and the operation command $C_S$, the acceleration $\alpha$ can be considered as a parameter acquired from the operation commands $C_M$ and $C_S$. The processor of the motor control device 50 stores the calculated acceleration $\alpha$ in the memory thereof.

As still another example, as the operation amount E, the motor control device 50 acquires the position command $C_A$ or the torque command $C_{\tau M}$ which constitutes the operation command $C_M$. Specifically, the processor of the motor control device 50 acquires the position command $C_A$ or the torque command $C_{\tau M}$ outputted from the motion command section 51 or the torque command generation section 62, and stores it in the memory of the motor control device 50.

As still another example, as the operation amount E, the motor control device 50 acquires the torque command $C_{\tau S}$ which constitutes the operation command $C_S$. Specifically, the processor of the motor control device 50 acquires the torque command $C_{\tau S}$ outputted from the torque command generation section 72, and stores it in the memory of the motor control device 50.

The processor of the motor control device 50 functions as the preload command adjustment section 56, and adjusts the preload command $C_{PM}$ or $C_{PS}$ so as to reduce one of the preload forces $F_{PM}$ and $F_{PS}$, which acts in the direction opposite the movement direction C or D, when the acquired operation amount E exceeds the predetermined threshold value $E_\alpha$ (i.e., $E > E_\alpha$).

The threshold value $E_\alpha$ is predetermined by a user. The threshold value $E_\alpha$ may be determined as a value greater than the preload command $C_{PM}$ or $C_{PS}$. Specifically, if the torque command $C_{\tau M}$ (or the torque command $C_{\tau S}$) is acquired as the operation amount E, the threshold value $E_\alpha$ is determined as a value greater than the preload command $C_{PM}$ (or the preload command $C_{PS}$).

Hereinafter, a method of adjusting the preload command $C_{PM}$ or the $C_{PS}$ by the preload command adjustment section 56 is described with reference to FIGS. 3 to 6. In FIGS. 3 to 6, a vertical axis represents a preload force $F_P$ acting on the driven object, and a horizontal axis represents the operation amount E. Further, a solid line in FIGS. 3 to 6 represents the preload force $F_{PM}$, while a chain line represents the preload force $F_{PS}$.

The positive region of the horizontal axis represents a magnitude of the preload force $F_P$ acting in the direction C in FIG. 2, while the negative region of the horizontal axis represents the magnitude of the preload force $F_P$ acting in the direction D in FIG. 2. Further, the positive region of the vertical axis represents a magnitude of the operation amount E (e.g., the acceleration $\alpha$, the position command $C_A$, the torque command $C_{\tau M}$, or the torque command $C_{\tau S}$) toward the direction C in FIG. 2, while the negative region of the horizontal axis represents the magnitude of the operation amount E toward the direction D in FIG. 2.

Figure 3:
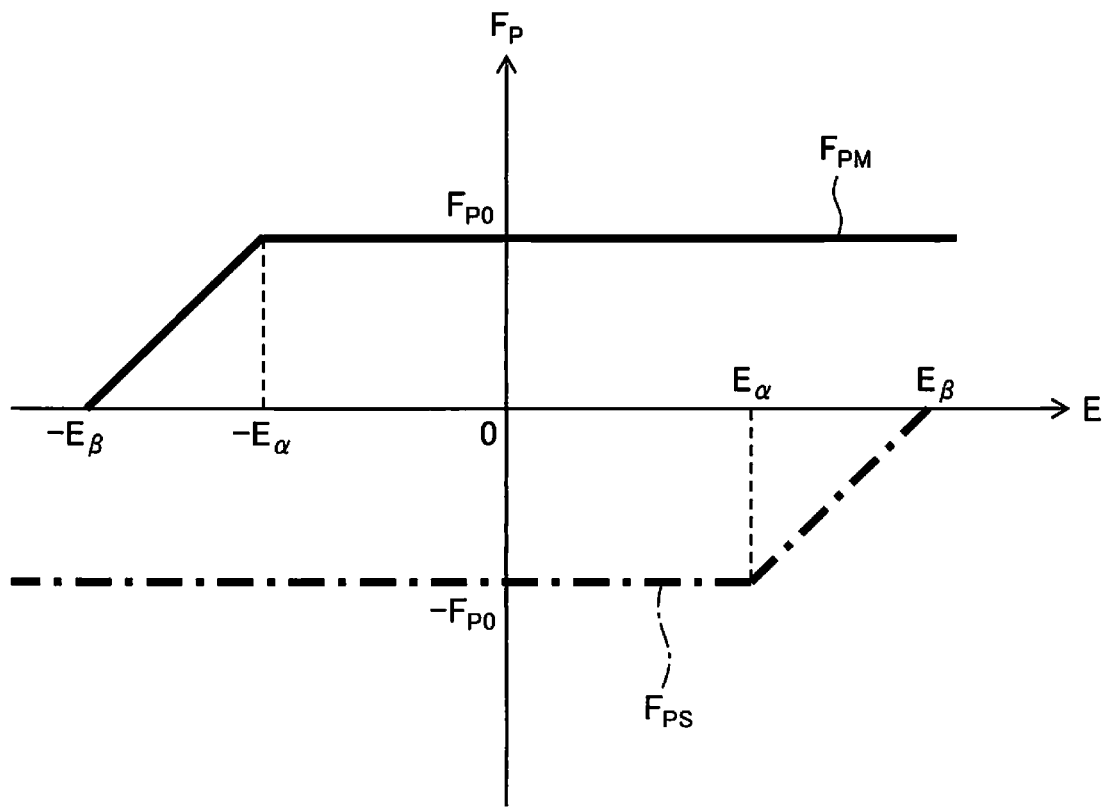
FIG. 3 is a graph illustrating one example of a preload command changing method.

For example, if the operation amount E is the torque command $C_{\tau M}$ and the operation amount E is a positive value in FIG. 3, the operation amount E means the torque command $C_{\tau M}$ for the motor 12 when the driven object A is driven toward the direction C.

In an example illustrated in FIG. 3, when the operation amount E is zero, the preload command generation section 54 generates the preload command $C_{PM}$ for generating the preload force $F_{PM}$ acting on the motor 12 in the direction C. The absolute value of the preload force $F_{PM}$ at this time is $F_{P0}$.

Concurrently, the preload command generation section 54 generates the preload command $C_{PS}$ for generating the preload force $F_{PS}$ acing on the motor 14 in the direction D. The absolute value of the preload force $F_{PS}$ at this time is $F_{P0}$ which is the same as that of the preload force $F_{PM}$.

When the operation amount E changes to a positive direction in FIG. 3 (i.e., the operation amount E toward the direction C increases) and exceeds the predetermined threshold value $E_\alpha$, the preload command adjustment section 56 changes the preload command $C_{PS}$ so as to reduce the absolute value of the preload force $F_{PS}$, which acts opposite the direction C, as the operation amount E increases.

As a result, the preload force $F_{PS}$ is zero (i.e., the preload command $C_{PS}=0$) when the operation amount E is equal to $E_\beta$ ($>E_\alpha$). At this time, the motor 12 drives the driven object A in the direction C by a net force of a force in accordance with the torque command $C_{\tau M}$ and the preload force $F_{PM}$, while the motor 14 drives the driven object A in the direction C by a force in accordance with the torque command $C_{\tau S}$.

On the contrary, when the operation amount E changes from $E_\beta$ to zero, the preload command adjustment section 56 changes the preload command $C_{PS}$ for the motor 14 so as to increase the absolute value of the preload force $F_{PS}$ acting in the direction D as the operation amount E decreases.

On the other hand, when the operation amount E changes from zero to the negative direction in FIG. 3 (i.e., the operation amount E toward the direction D increases) and exceeds a predetermined threshold value $-E_\alpha$, the preload command adjustment section 56 changes the preload command $C_{PM}$ for the motor 12 so as to reduce the preload force $F_{PM}$ acting opposite the direction D as the absolute value of the operation amount E increases.

As a result, the preload force $F_{PM}$ is zero (i.e., the preload command $C_{PM}=0$) when the operation amount E is equal to $-E_\beta$. At this time, the motor 12 drives the driven object A in the direction D by a force in accordance with the torque command $C_{\tau M}$, while the motor 14 drives the driven object A in the direction D by a net force of a force in accordance with the torque command $C_{\tau S}$ and the preload force $F_{PS}$.

On the contrary, when the operation amount E changes from $-E_\beta$ to zero, the preload command adjustment section 56 changes the torque command $C_{\tau M}$ so as to increase the preload force $F_{PM}$ acting in the direction C as the absolute value of the operation amount E decreases.

Thus, in the example illustrated in FIG. 3, when the driven object stands still (i.e., the operation amount E=0), the preload is applied to the driven object A by the preload force $F_{PM}$ and the preload force $F_{PS}$ which act in directions opposite to each other, thereby backlash is prevented.

On the other hand, when the operation amount E is increased to satisfy $|E|>E_\alpha$ in order to move the driven object A in the direction C or D, the preload force $F_{PM}$ or $F_{PS}$, which acts in a direction opposite to the movement direction C or D of the driven object A, can be reduced. Thereby, it is possible to promptly position the driven object A at a target position.

Further, in the example illustrated in FIG. 3, the preload force $F_{PM}$ or $F_{PS}$ acting in a direction opposite to the movement direction C or D is gradually decreased as the operation amount E increases after exceeding the threshold value $E_\alpha$. According to this configuration, it is possible to reduce a mechanical shock applied to the driven object A when the preload force $F_{PM}$ or $F_{PS}$ is decreased.

Figure 4:
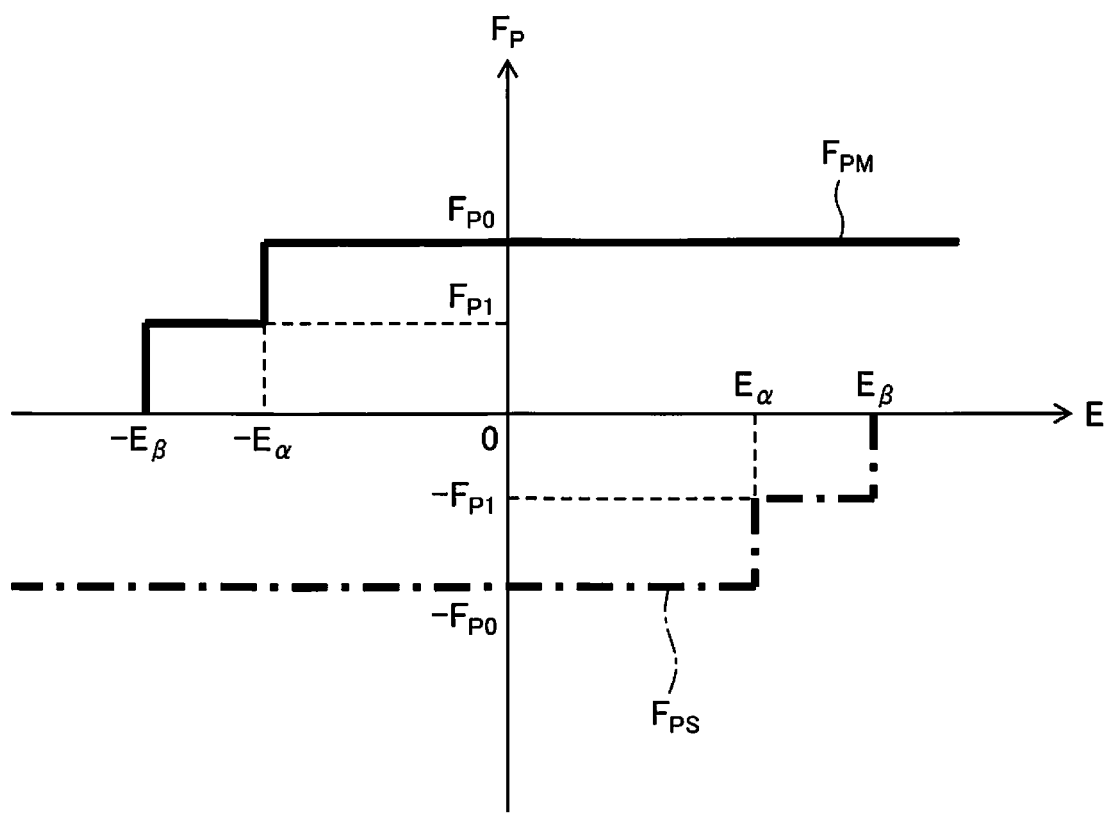
FIG. 4 is a graph illustrating another example of the preload command changing method.

In the example illustrated in FIG. 4, when the operation amount E changes to the positive direction and exceeds the predetermined threshold value $E_\alpha$, the preload command adjustment section 56 changes the preload command $C_{PS}$ so as to reduce the absolute value of the preload force $F_{PS}$ acting opposite to the movement direction C in a stepwise manner.

Specifically, when the operation amount E changes to a positive direction and exceeds the threshold value $E_\alpha$, the preload command generation section 54 reduces the absolute value of the preload force $F_{PS}$ from $F_{P0}$ to $F_{P1}$ ($|F_{P0}|>|F_{P1}|$) in a stepwise manner.

When the operation amount E further changes to a positive direction to be $E=E_\beta$, the preload command adjustment section 56 decreases the absolute value of the preload force $F_{PS}$ from $F_{P1}$ to zero in a stepwise manner.

On the contrary, when the operation amount E changes from $E_\beta$ to zero, the preload command adjustment section 56 changes the preload command $C_{PS}$ so as to increase the absolute value of the preload force $F_{PS}$ acting in the direction D in a stepwise manner in response to the operation amount E.

On the other hand, when the operation amount E changes to the negative direction and exceeds the threshold value $-E_\alpha$, the preload command adjustment section 56 decreases the preload force $F_{PM}$ acting opposite to the movement direction D from $F_{P0}$ to $F_{P1}$ in a stepwise manner. When the operation amount E further changes to the negative direction to be $E=-E_\beta$, the preload command generation section 54 decreases the preload force $F_{PM}$ from $F_{P1}$ to zero in a stepwise manner.

On the contrary, when the operation amount E changes from $-E_\beta$ to zero, the preload command adjustment section 56 changes the preload command $C_{PS}$ so as to increase the preload force $F_{PM}$ acting in the direction C in a stepwise manner to be inversely-proportional to the absolute value of the operation amount E.

In the example illustrated in FIG. 4, since the preload force $F_{PM}$ or $F_{PS}$ acting in a direction opposite to the movement direction C or D of the driven object A can be reduced, it is possible to promptly position the driven object A at a target position.

Figure 5:
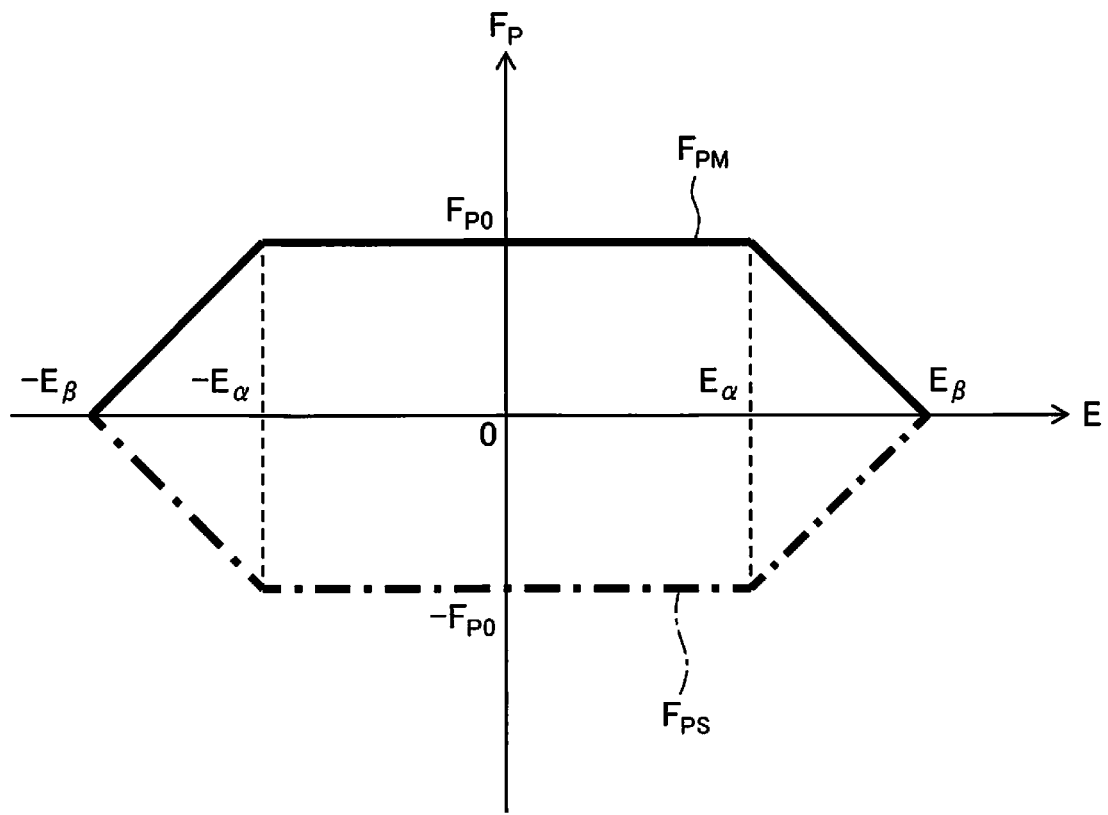
FIG. 5 is a graph illustrating still another example of the preload command changing method.

In the example illustrated in FIG. 5, when the operation amount E changes to the positive direction and exceeds the threshold value $E_\alpha$, the preload command adjustment section 56 adjusts the preload commands $C_{PM}$ and $C_{PS}$ so as to reduce the absolute values of both of the preload forces $F_{PM}$ and $F_{PS}$ in synchronization with each other.

Specifically, when the operation amount E changes to the positive direction and exceeds the threshold value Eα, the preload command adjustment section 56 gradually decreases the absolute value of the preload force FPS acting opposite to the movement direction C as the 25 operation amount E increases, and sets it to zero when the operation amount E reaches Eβ.

In synchronization with the gradual decrease of the preload force FPS, the preload command adjustment section 56 gradually decreases the preload force FPM acting in the 30 movement direction C as the operation amount E increases, and sets it to zero when the operation amount E reaches Eβ.

On the contrary, when the operation amount E changes from $E_\beta$ toward zero, the preload command adjustment section 56 adjusts the preload commands $C_{PM}$ and $C_{PS}$ so as to increase the absolute values of both of the preload forces $F_{PM}$ and $F_{PS}$ in synchronization with each other.

On the other hand, when the operation amount E changes from zero to the negative direction and exceeds the predetermined threshold value $-E_\alpha$, the preload command adjustment section 56 adjusts the preload commands $C_{PM}$ and $C_{PS}$ so as to gradually reduce the absolute values of both of the preload forces $F_{PM}$ and $F_{PS}$ in synchronization with each other.

On the contrary, when the operation amount E changes from $-E_\beta$ to zero, the preload command adjustment section 56 adjusts the preload commands $C_{PM}$ and $C_{PS}$ so as to increase the absolute values of both of the preload forces $F_{PM}$ and $F_{PS}$ in synchronization with each other.

Thus, in the example illustrated in FIG. 5, the preload command adjustment section 56 reduces the preload force $F_{PM}$ or $F_{PS}$ acting in a direction opposite to the movement direction C or D of the driven object A, and also reduces the preload force $F_{PM}$ or $F_{PS}$ acting in the movement direction C or D of the driven object A.

According to this configuration, it is possible to prevent a difference between the preload forces $F_{PM}$ and $F_{PS}$ applied to the driven object A from occurring after the absolute value of the operation amount E exceeds the threshold value $E_\alpha$, thereby strain on the driven object A due to the difference between the preload forces $F_{PM}$ and $F_{PS}$ can be prevented.

Further, the preload applied to the driven object A is itself a cause of deforming the driven object A. Thus, decreasing both of the preload force acting in the movement direction C or D and the preload force acting in the direction opposite to the movement direction C or D as in the example illustrated in FIG. 5 is effective to prevent deformation of the driven object A.

In addition, in the example illustrated in FIG. 5, the preload command adjustment section 56 reduces the preload force $F_{PM}$ or $F_{PS}$ acting in the direction opposite to the movement direction C or D of the driven object A, and the preload force $F_{PM}$ or $F_{PS}$ acting in the movement direction C or D of the driven object A, in a synchronized manner. By concurrently changing the preload forces in two directions with respect to time in this manner, it is possible to reliably prevent the deformation of the driven object A from being unbalanced.

Figure 6:
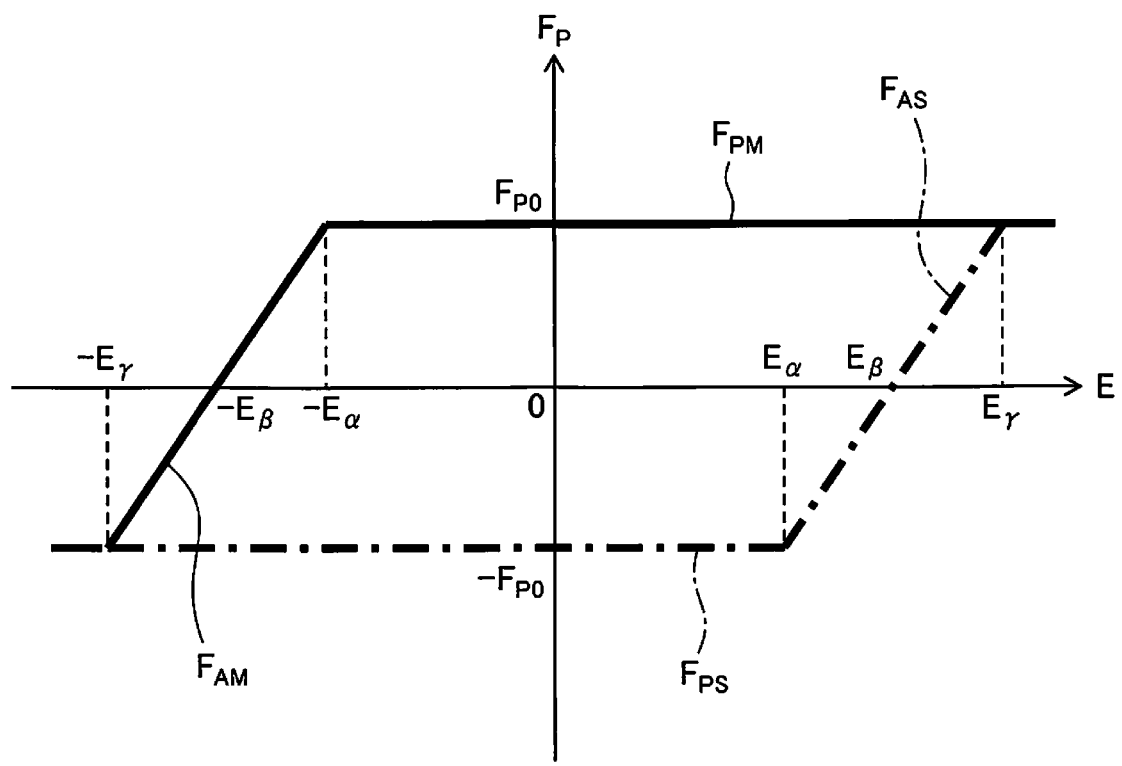
FIG. 6 is a graph illustrating still another example of the preload command changing method.

In the example illustrated in FIG. 6, when the operation amount E changes to the positive direction and exceeds the threshold value $E_\alpha$, the preload command adjustment section 56 changes the preload command $C_{PS}$ so as to reduce the magnitude of the preload force $F_{PS}$ acting opposite to the movement direction C as the operation amount E increases, and sets it to zero when the operation amount E reaches $E_\beta$, similarly to the examples of FIGS. 3 and 5.

When the operation amount E further changes to the positive direction from the threshold value $E_\beta$ after the preload force $F_{PS}$ is zero (the preload command $C_{PS}=0$), the preload command generation section 54 generates an additional force command $C_{AS}$ and adds it to the torque command $C_{\tau S}$ for the motor 14.

The additional force command $C_{AS}$ is a command inputted to the motor 14 in order for the drive axis 14a of the motor 14 applies an additional force $F_{AS}$ to the driven object A in the movement direction C. The preload command adjustment section 56 adjusts the additional force command $C_{AS}$ so as to increase the additional force $F_{AS}$ acting in the direction C to be proportional to the operation amount E.

As a result, when the operation amount E reaches $E_\gamma$, the additional force $F_{AS}$ is a force of magnitude $F_{P0}$ which acts in the movement direction C. At this time, the motor 12 drives the driven object A in the direction C by a net force of a force in accordance with the torque command $C_{\tau M}$ and the preload force $F_{PM}$, while the motor 14 drives the driven object A in the direction C by a net force of a force in accordance with the torque command $C_{\tau S}$ and the additional force $F_{AS}$.

On the contrary, when the operation amount E decreases from $E_\gamma$ to the threshold value $E_\beta$, the preload command adjustment section 56 changes the additional force command $C_{AS}$ so as to reduce the absolute value of the additional force $F_{AS}$ acting in the direction C together with the operation amount E.

When the operation amount E further decreases to zero from $E_\beta$, the preload command generation section 54 generates again the preload command $C_{PS}$ for the motor 14, and the preload command adjustment section 56 adjusts the preload command $C_{PS}$ so as to increase the absolute value of the preload force $F_{PS}$ as the operation amount E decreases.

On the other hand, when the operation amount E changes from zero to the negative direction and exceeds the threshold value $-E_\alpha$, similarly to the examples of FIGS. 3 and 5, the preload command adjustment section 56 changes the preload command $C_{PM}$ so as to reduce the absolute value of the preload force $F_{PM}$ acting opposite to the movement direction D as the absolute value of the operation amount E increases.

When the operation amount E exceeds the threshold value $-E_\beta$ after the preload force $F_{PM}$ reaches zero (the preload command $C_{PM}=0$) and further changes to the negative direction, the preload command generation section 54 generates an additional force command $C_{AM}$, and adds it to the torque command $C_{\tau M}$ for the motor 12.

The additional force command $C_{AM}$ is a command inputted to the motor 12 in order for the drive axis 12a of the motor 12 to apply an additional force $F_{AM}$ to the driven object A in the movement direction D. The preload command adjustment section 56 adjusts the additional force command $C_{AM}$ so as to increase the absolute value of the additional force $F_{AM}$ acting in the movement direction D together with the absolute value of the operation amount E.

As a result, when the operation amount E reaches $-E_\gamma$, the additional force $F_{AM}$ is a force of magnitude $F_{P0}$ acting in the movement direction D. At this time, the motor 12 drives the driven object A in the direction D with a net force of a force in accordance with the torque command $C_{\tau M}$ and the additional force $F_{AM}$, while the motor 14 drives the driven object A in the direction D by a net force of a force in accordance with the torque command $C_{\tau S}$ and the preload force $F_{PS}$.

On the contrary, when the operation amount E changes from $-E_\gamma$ to $-E_\beta$, the preload command adjustment section 56 changes the additional force command $C_{AM}$ so as to reduce the absolute value of the additional force $F_{AM}$ acting in the direction D together with the absolute value of the operation amount E.

Subsequently, when the operation amount E exceeds $-E_\beta$ and further changes to zero, the preload command generation section 54 generates again the preload command $C_{PM}$ for the motor 12, and the preload command adjustment section 56 adjusts the preload command $C_{PM}$ so as to increase the absolute value of the preload force $F_{PM}$ as the absolute value of the operation amount E decrease.

In the example illustrated in FIG. 6, when the absolute value of the operation amount E is greater than $E_\beta$, the additional force $F_{AS}$ or $F_{AM}$ acting in the movement direction C or D of the driven object A is further added to the driven object A. According to this configuration, it is possible to increase a net force in the movement direction C or D applied from the motors 12 and 14 to the driven object A. Thus, since it is possible to increase an acceleration of the driven object A when the driven object A is positioned at a target position, the time necessary for positioning can be reduced.

Figure 7:
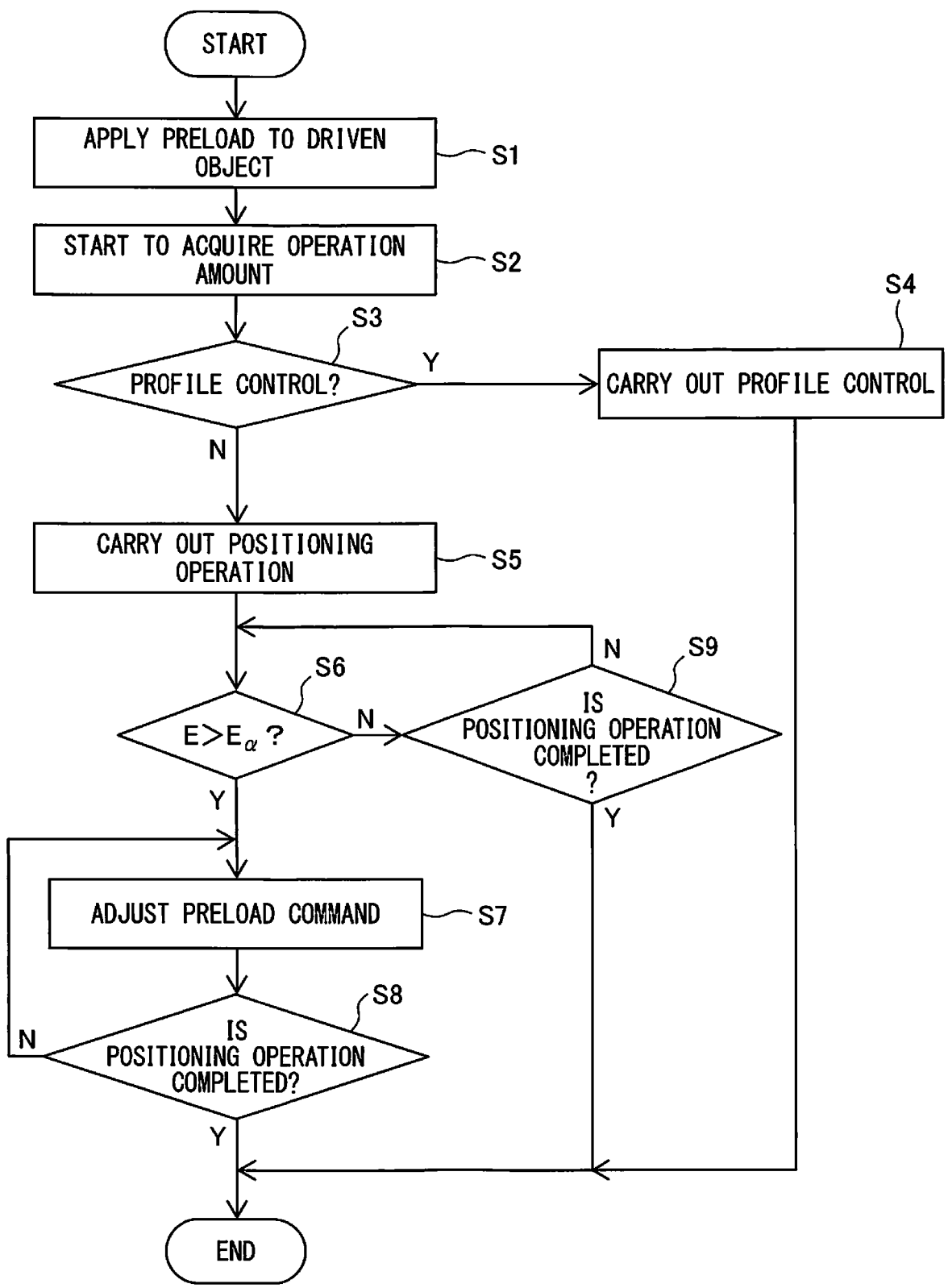
FIG. 7 is a flowchart illustrating one example of an operation flow of the motor system as illustrated in FIG. 1.

Next, an operation flow of the motor system 10 will be described with reference to FIG. 7. The flow illustrated in FIG. 7 is started when the processor of the motion command section 51 receives from an operator or a computer program a positioning command for positioning the driven object A.

In step S1, the motor control device 50 applies a preload to the driven object A. Specifically, the preload command generation section 54 generates the preload commands $C_{PM}$ and $C_{PS}$, and transmits them to the adders 68 and 80, respectively.

At this time, the motion command section 51 does not transmit the position command $C_A$, and therefore, the commands inputted to the current controllers 64 and 74 are only the preload commands $C_{PM}$ and $C_{PS}$.

Accordingly, the motors 12 and 14 respectively apply the preload force $F_{PM}$ in accordance with the preload command $C_{PM}$ and the preload force $F_{PS}$ in accordance with the preload command $C_{PS}$ to the driven object A, by which the preload is given to the driven object A.

In step S2, the motor control device 50 starts to acquire the operation amount E. Specifically, the motor control device 50 acquires the above-mentioned acceleration α, the operation command $C_M$ (e.g., the torque command $C_{\tau M}$), or the operation command $C_S$ (e.g., the torque command $C_{\tau S}$). For example, the motor control device 50 repeatedly acquires the operation amount E at a cycle T (e.g., T=0.2 [sec]).

In step S3, the motor control device 50 determines whether to carry out a profile control. The profile control is a control to cause the driven object A to carry out machining operation toward a target position by the motors 12 and 14 in a state where the preload is applied to the driven object A (i.e., in an anti-backlash mode).

By way of example, the processor of the motor control device 50 determines whether or not the most-recently acquired operation amount E exceeds a threshold value $E_0$ (E>$E_0$). The threshold value $E_0$ is predetermined by a user, and stored in the memory of the motor control device 50. For example, the threshold value $E_0$ may be set to be equal to or smaller than the above-mentioned threshold value $E_\alpha$ ($E_0 \leq E_\alpha$).

When E>$E_0$ is satisfied, the processor of the motor control device 50 determines to carry out the profile control (i.e., determines YES), and proceeds to step S4. On the other hand, when the operation amount E does not exceed the threshold value $E_0$, the processor of the motor control device 50 determines not to carry out the profile control (i.e., determines NO), and proceeds to step S5.

By way of another example, a profile control command is included in a computer program. The profile control command is a command for causing the motor control device 50 to carry out the profile control. When receiving the profile control command included in the computer program, the processor of the motor control device 50 determines "YES", and proceeds to step S4. On the other hand, when the profile control command is not included in the computer program, the processor of the motor control device 50 determines "NO", and proceeds to step S5.

In step S4, the motor control device 50 carries out the profile control. Specifically, the motor control device 50 drives the motors 12 and 14 so as to cause the driven object A to carry out machining operation toward the target position in the anti-backlash mode. Thereby, the driven object A is driven by the motors 12 and 14 while the preload force $F_{PM}$ and the preload force $F_{PS}$ are applied from the motors 12 and 14.

In step S5, the motor control device 50 carries out a positioning operation to position the driven object A at a target position. Specifically, the motion command section 51 generates the position command $C_A$ for positioning the driven object A at the target position, and transmits it to the operation command generation section 52 (specifically, the speed command generation sections 60 and 70).

For example, the motion command section 51 generates the position command $C_A$ in accordance with a computer program. This computer program can be stored in advance in the memory of the motion command section 51.

When receiving the position command $C_A$, the operation command generation section 52 generates the operation commands $C_M$ and $C_S$ by the method as stated above, and transmits them via the servo amplifiers 18 and 20 to the motors 12 and 14, respectively. Thus, the motors 12 and 14 drive the driven object A in the movement direction C or D determined in response to the position command $C_A$ generated by the motion command section 51.

In step S6, the processor of the motor control device 50 determines whether or not the most-recently acquired operation amount E exceeds the threshold value $E_\alpha$ (E>$E_\alpha$). When the processor of the motor control device 50 determines that E>$E_\alpha$ is satisfied (i.e., determines YES), it proceeds to step S7. On the other hand, when the processor of the motor control device 50 determines that the operation amount E does not exceed the threshold value $E_\alpha$ (i.e., determines NO), it proceeds to step S9.

In step S7, the preload command adjustment section 56 carries out a scheme for adjusting at least one of the preload command $C_{PM}$ and the preload command $C_{PS}$. Specifically, the preload command adjustment section 56 changes at least one of the preload command $C_{PM}$ and the preload command $C_{PS}$ on the basis of the operation amount E, in accordance with the method described above with reference to FIGS. 3 to 6.

In this way, when determining NO in step S3 and determining YES in step S6, the motor control device 50 drives the driven object A in the drive direction C or D by the motors 12 and 14 in a state where the preload is not applied to the driven object A (i.e., in a so-called load sharing mode).

In step S8, the processor of the motor control device 50 determines whether or not the operation to position the driven object A at the target position is completed. Specifically, when a difference between the position command $C_A$ and the position feedback $P_{FB}$ is zero, the processor of the motor control device 50 determines that the operation to position the driven object A at the target position is completed (i.e., determines YES). When determining YES, the processor of the motor control device 50 ends the flow illustrated in FIG. 7.

When the processor of the motor control device 50 determines YES in this step S8, the operation amount E is zero, and the preload forces $F_{PM}$ and $F_{PS}$ of magnitude $F_{P0}$ are applied to the driven object A, as illustrated in FIGS. 3 to 6. On the other hand, when the processor of the motor control device 50 determines that the operation to position the driven object A at the target position is not completed (i.e., determines NO), it returns to step S7.

When it is determined NO in step S6, in step S9, the processor of the motor control device 50 determines whether or not the operation to position the driven object A at the target position is completed, similarly to the above-mentioned step S8. The processor of the motor control device 50 ends the flow illustrated in FIG. 7 when it determines YES, while the processor of the motor control device 50 returns to step S6 when it determines NO.

In the above-mentioned embodiment, the preload commands $C_{PM}$ and $C_{PS}$ are respectively added to the torque commands $C_{\tau M}$ and $C_{\tau S}$. However, the preload commands $C_{PM}$ and $C_{PS}$ may be added to the position command $C_A$.

Figure 8:
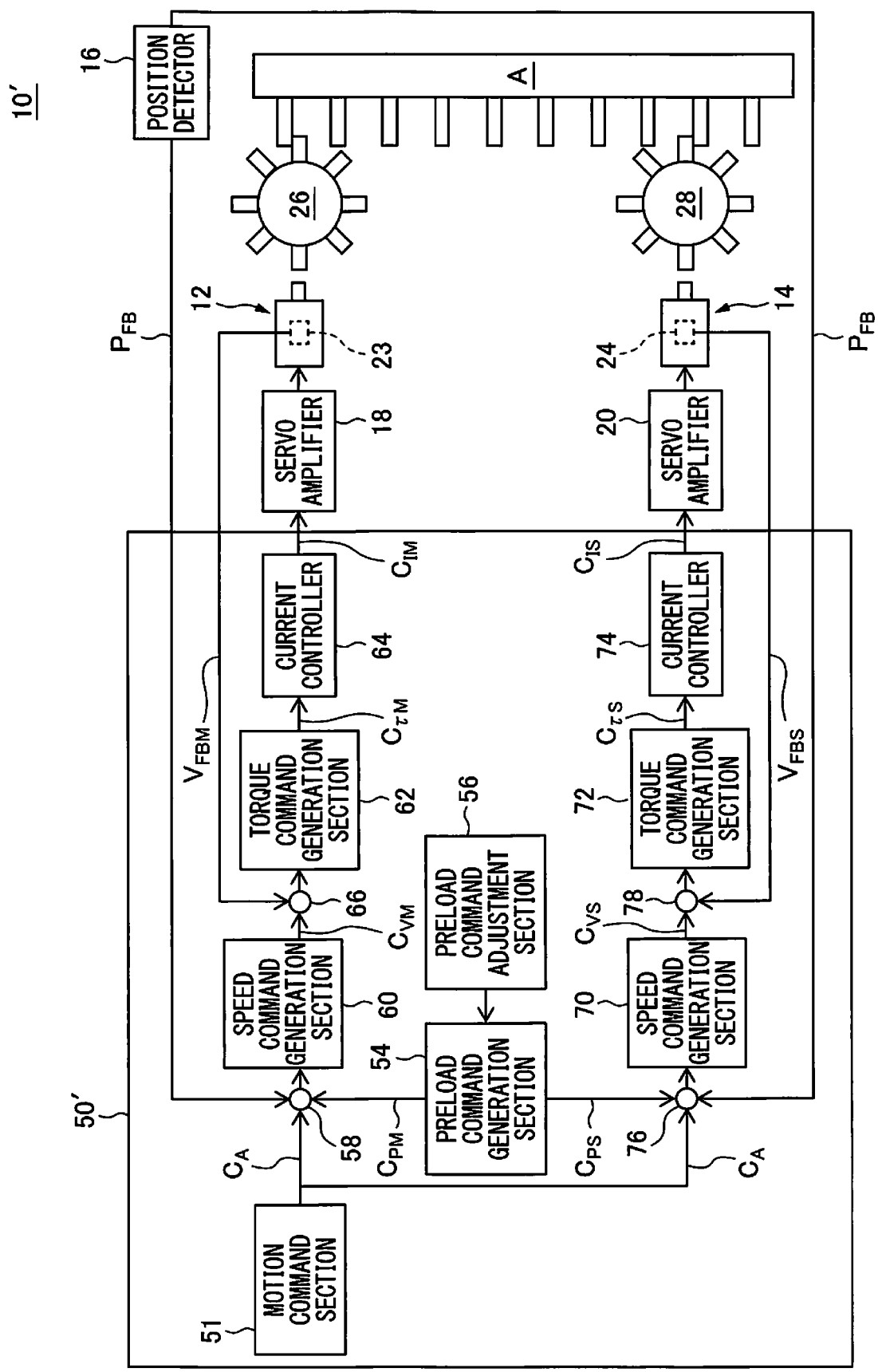
FIG. 8 is a block diagram of the motor system according to another embodiment.

Hereinafter, such an embodiment will be described with reference to FIG. 8. In the motor control device 50' of the motor system 10' illustrated in FIG. 8, the preload command $C_{PM}$ generated by the preload command generation section 54 is added to the position command $C_A$ outputted from the motion command section 51 at the adder 58.

Further, the preload command $C_{PS}$ generated by the preload command generation section 54 is added to the position command $C_A$ outputted from the motion command section 51 at the adder 76. In this embodiment, each of the preload commands $C_{PM}$ and $C_{PS}$ is generated as a position command.

Herein, considering a displacement of the driven object A as elastic deformation of a spring, it can be considered that a position and a force are substantially equivalent physical amounts at a portion of the driven object A on which the preload forces $F_{PM}$ and $F_{PS}$ acts, according to Hooke's law (F=kx). Accordingly, by applying the preload command $C_{PM}$ and the preload command $C_{PS}$ to the position command $C_A$, it is possible to apply the preload to the driven object A.

Then, when the operation amount E (e.g., the position command $C_A$) exceeds the threshold value $E_\alpha$, the preload command adjustment section 56 adjusts the preload command $C_{PM}$ or $C_{PS}$ with the above-mentioned method.

In the above-mentioned embodiments, the motor control device 50 includes one preload command generation section 54, wherein the processor of the motor control device 50 functions as the preload command generation section 54.

Figure 9:
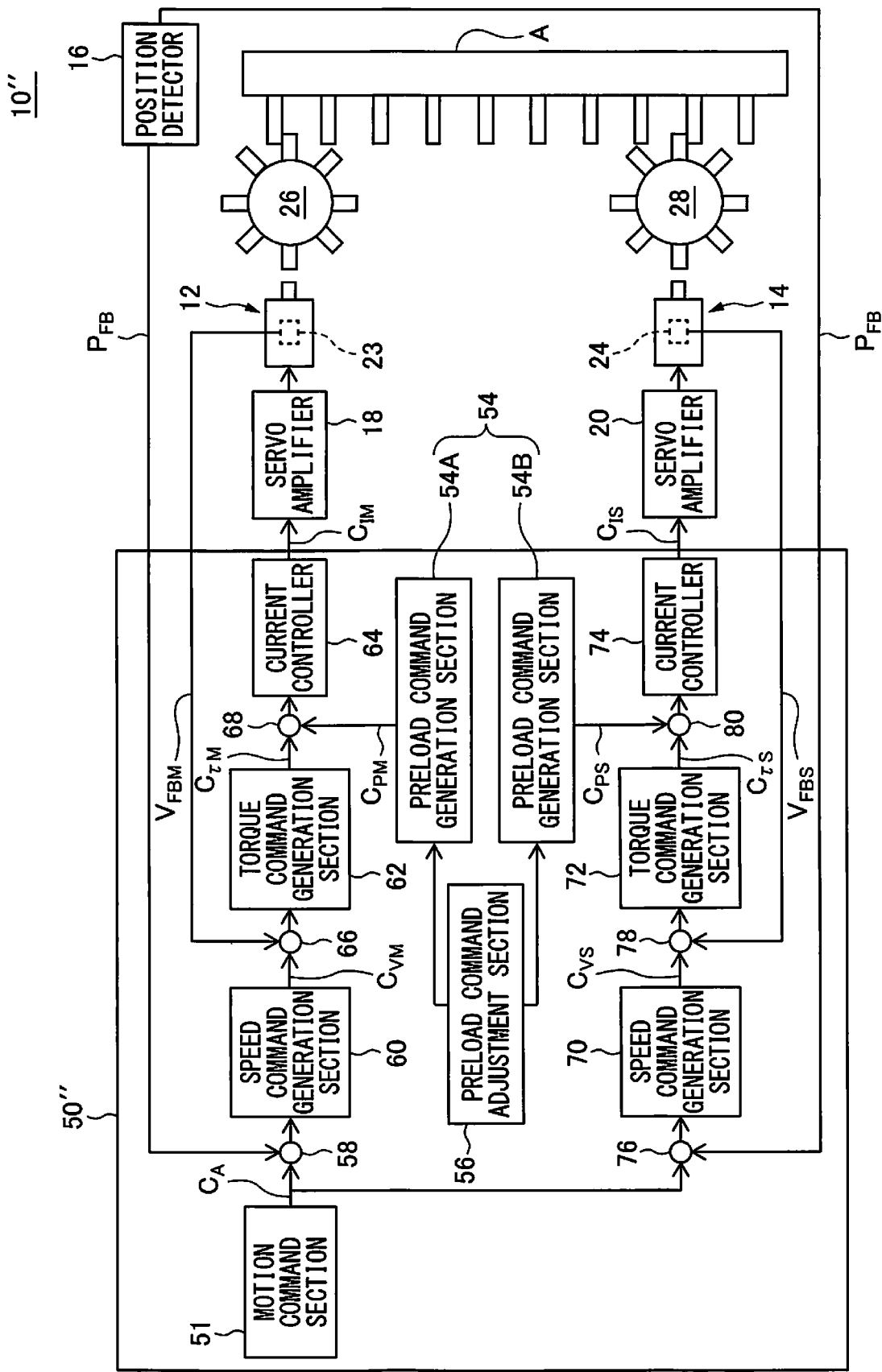
FIG. 9 is a block diagram of the motor system according to still another embodiment.

However, the motor control device 50 may include two preload command generation sections 54A and 54B. Such an embodiment is illustrated in FIG. 9. In a motor control device 50" of a motor system 10" illustrated in FIG. 9, the preload command generation section 54 includes a preload command generation section 54A and a preload command generation section 54B.

The preload command generation section 54A generates the preload command $C_{PM}$ and transmits it to the adder 68. On the other hand, the preload command generation section 54B generates the preload command $C_{PS}$ and transmits it to the adder 80.

A first processor of the motor control device 50" may functions as the preload command generation section 54A, while a second processor of the motor control device 50" may functions as the preload command generation section 54B.

In the above-mentioned embodiments, the motor control device 50, 50', or 50" includes the torque command generation sections 62 and 72. However, the motor control device 50, 50', or 50" may include an acceleration command generation section or a current command generation section, in place of the torque command generation sections 62 and 72. Such embodiments are illustrated in FIGS. 10 and 11.

Figure 10:
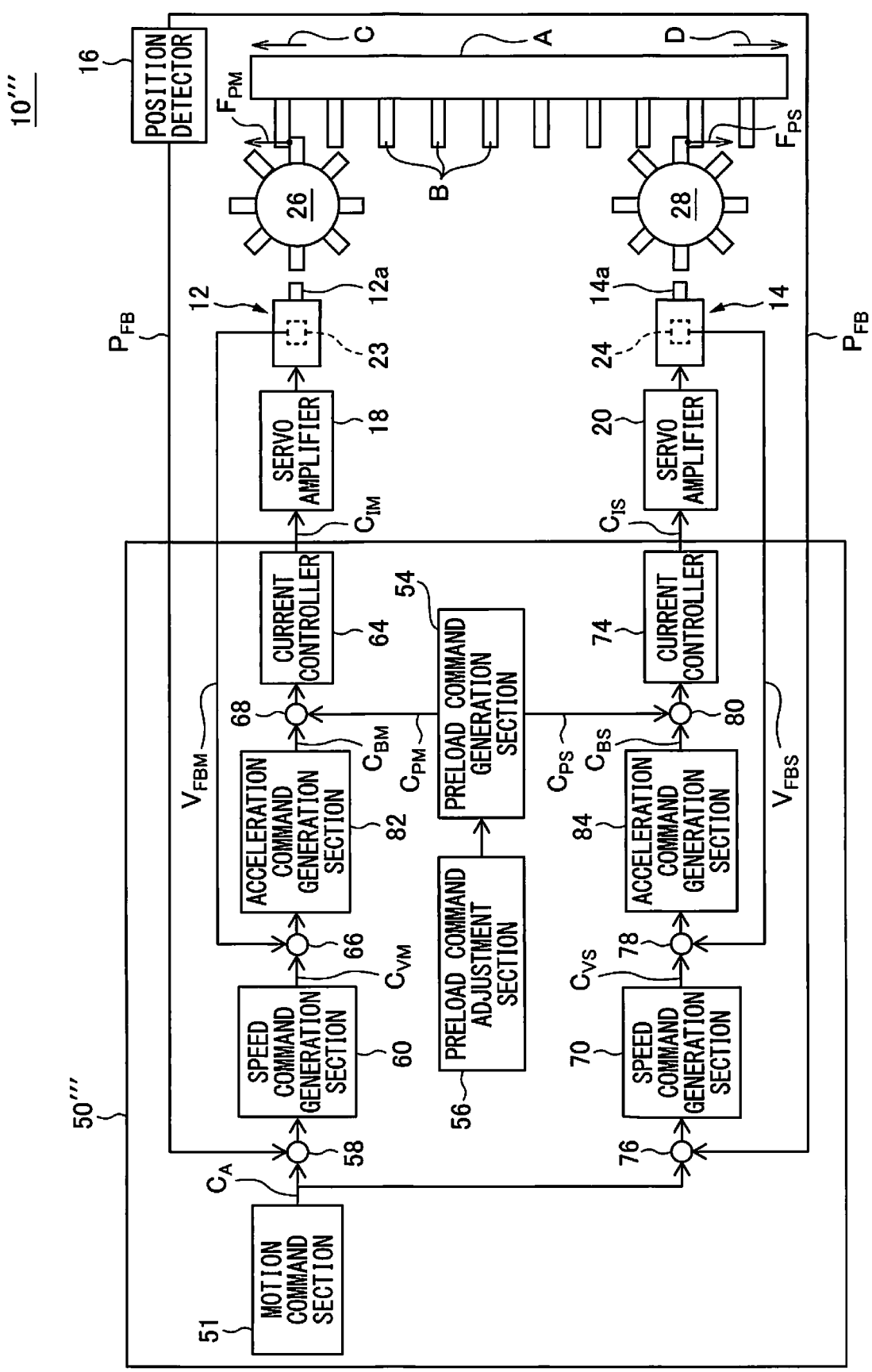
FIG. 10 is a block diagram of the motor system according to still another embodiment.

A motor control device 50''' of a motor system 10''' illustrated in FIG. 10 includes acceleration command generation sections 82 and 84, in place of the torque command generation sections 62 and 72. The acceleration command generation section 82 generates an acceleration command $C_{BM}$ on the basis of a value obtained by subtracting the speed feedback $V_{FBM}$ from the speed command $C_{VM}$, and transmits it to the current controller 64. The preload command generation section 54 generates the preload command $C_{PM}$ as an acceleration command, and the generated preload command $C_{PM}$ is added to the acceleration command $C_{BM}$ at the adder 68.

On the other hand, the acceleration command generation section 84 generates an acceleration command $C_{BS}$ on the basis of a value obtained by subtracting the speed feedback $V_{FBS}$ from the speed command $C_{VS}$, and transmits it to the current controller 74. The preload command generation section 54 generates the preload command $C_{PS}$ as an acceleration command, and the generated preload command $C_{PS}$ is added to the acceleration command $C_{BS}$ at the adder 80.

Figure 11:
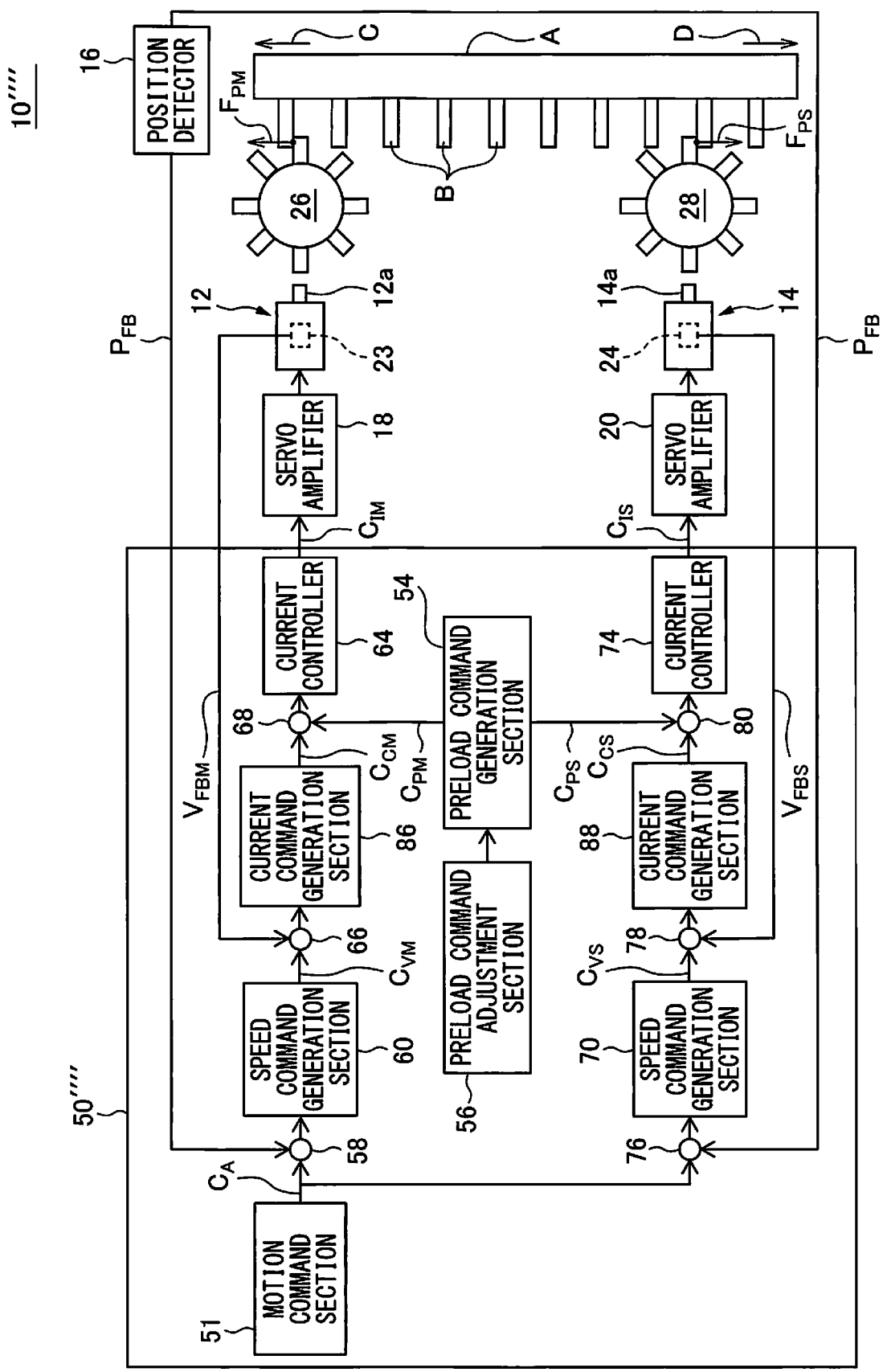
FIG. 11 is a block diagram of the motor system according to still another embodiment.

A motor control device 50'''' of a motor system 10'''' illustrated in FIG. 11 includes current command generation sections 86 and 88, in place of the torque command generation sections 62 and 72. The current command generation section 86 generates a current command $C_{CM}$ on the basis of a value obtained by subtracting the speed feedback $V_{FBM}$ from the speed command $C_{VM}$, and transmits it to the current controller 64. The preload command generation section 54 generates the preload command $C_{PM}$ as a current command, and the generated preload command $C_{PM}$ is added to the current command $C_{CM}$ at the adder 68.

On the other hand, the current command generation section 88 generates a current command $C_{CS}$ on the basis of a value obtained by subtracting the speed feedback $V_{FBS}$ from the speed command $C_{VS}$, and transmits it to the current controller 74. The preload command generation section 54 generates the preload command $C_{PS}$ as a current command, and the generated preload command $C_{PS}$ is added to the current command $C_{CS}$ at the adder 80.

In the above-mentioned embodiments, the motor control device 50, 50', 50", 50''', and 50'''' each include the motion command section 51. However, the motion command section 51 may be provided outside of the motor control device 50, 50', 50", 50''', or 50'''', as an element separate from the motor control device 50, 50', 50", 50''', or 50''''.

Further, the servo amplifiers 18 and 20 may be incorporated in the motor control device 50, 50', 50", 50''', or 50''''. Further, the current controllers 64 and 74 may be omitted from the motor control device 50, 50', 50", 50''', or 50''''. Further, the servo amplifiers 18 and 20 may be omitted from the motor system 10, 10', 10", 10''', or 10''''.

In the above-mentioned embodiments, the motor control device 50, 50', 50", 50''', 50'''' acquires the acceleration α, the operation command $C_M$, or the operation command $C_S$, as the operation amount E. However, the motor control device 50, 50', 50", 50''' or 50'''' may acquire at least two of the acceleration α, the operation command $C_M$, and the operation command $C_S$ as the operation amount E.

In such a case, the preload command generation section 54 may change the preload command $C_{PM}$ or $C_{PS}$ so as to decrease the preload force $F_{PM}$ or $F_{PS}$ acting opposite to the movement direction, when a first operation amount $E_1$ (e.g., the acceleration α) exceeds a first threshold value $E_{1\alpha}$ set for the first operation amount $E_1$ and/or a second operation amount $E_2$ (e.g., the operation command $C_M$) exceeds a second threshold value $E_{2\alpha}$ set for the second operation amount $E_2$.

Further, the motor control device 50, 50', 50", 50''', or 50'''' may acquire, as the operation amount E, both the position command $C_A$ and the torque command $C_{\tau M}$ which constitute the operation command $C_M$. Alternatively, the motor control device 50, 50', 50", 50''', or 50'''' may acquire, as the operation amount E, both the position command $C_A$ and the torque command $C_{\tau S}$ which constitute the operation command $C_S$.

Further, the motor system 10, 10', 10", 10''', or 10'''' may include a first position detector 16A and a second position detector 16B. In this case, the first position detector 16A may transmit a first position feedback $P_{FB1}$ to the subtractor 58, while the second position detector 16B may transmit a second position feedback $P_{FB2}$ to the subtractor 76. Further, the position detector 16 may be omitted from the motor system 10, 10', 10", 10''', or 10''''.

In the above-mentioned embodiments, in the operation command $C_M$ and the operation command $C_S$, the position command $C_A$ for the speed command generation sections 60 and 70 is common. However, the position command $C_A$ and the speed command $C_V$ may be common.

In this case, the speed command generation section 70 and the subtractors 76 and 78 are omitted, and a command obtained by subtracting the speed feedback $V_{FBM}$ from the speed command $C_V$ outputted from the speed command generation section 60 is transmitted from the subtractor 66 to each of the torque command generation sections 62 and 72.

Similarly, in the operation command $C_M$ and the operation command $C_S$, the position command $C_A$, the speed command $C_V$, and the torque command $C_\tau$ may be common. Further, the motor 12 and the motor 14 may be any type of electric motor, such as a synchronous motor, an induction motor, or a linear motor.

This disclosure has been described above through embodiments, but the above embodiments are not to limit the invention as claimed.

The invention claimed is:

1. A motor control device configured to control a first motor and a second motor to drive a driven object, the motor control device comprising:
    a processor configured to:
        generate a first operation command for the first motor to move the driven object in cooperation with the second motor and a second operation command for the second motor to move the driven object in cooperation with the first motor,
        generate a first preload command to be added to the first operation command and a second preload command to be added to the second operation command in order for a drive axis of the first motor and a drive axis of the second motor to apply forces in opposite directions to the driven object when the driven object is stopped, and
        adjust the first preload command and the second preload command so as to reduce an absolute value of the forces when an operation amount, that is acquired from at least one of the first operation command generated for the first motor to move the stopped driven object in a direction and the second operation command generated for the second motor to move the stopped driven object in the same direction, increases from a value at a time when the driven object is stopped and exceeds a predetermined threshold value.

2. The motor control device according to claim 1, wherein the first preload command is added to the first operation command in order for the drive axis of the first motor to apply a first force to the driven object in the same direction,
    the second preload command is added to the second operation command in order for the drive axis of the second motor to apply a second force to the driven object in a direction opposite the same direction, and
    the processor is further configured to adjust the second preload command so as to reduce the second force when the operation amount exceeds the threshold value.

3. The motor control device according to claim 2, wherein the processor is further configured to adjust the second preload command so as to reduce the second force as the operation amount increases.

4. The motor control device according to claim 2, wherein the processor is further configured to adjust the second preload command so as to reduce the second force gradually or in a stepwise manner.

5. The motor control device according to claim 2, wherein the processor is further configured to
    generate an additional force command for the drive axis of the second motor to apply an additional force to the driven object in the same direction, and
    add the generated additional force command to the second operation command, when the second force is zero.

6. The motor control device according to claim 2, wherein the processor is further configured to adjust the first preload command so as to reduce the first force.

7. The motor control device according to claim 6, wherein the processor is further configured to adjust the first preload command so as to reduce the first force in synchronization with the second force.

8. A method of controlling a first motor and a second motor to drive a driven object, the method comprising:
    generating a first operation command for the first motor to move the driven object in cooperation with the second motor and a second operation command for the second motor to move the driven object in cooperation with the first motor;
    generating a first preload command to be added to the first operation command and a second preload command to be added to the second operation command in order for a drive axis of the first motor and a drive axis of the second motor to apply forces in opposite directions to the driven object when the driven object is stopped; and
    adjusting the first preload command and the second preload command so as to reduce an absolute value of the forces when an operation amount, that is acquired from at least one of the first operation command generated for the first motor to move the stopped driven object in a direction and the second operation command generated for the second motor to move the stopped driven object in the same direction, increases from a value at a time when the driven object is stopped and exceeds a predetermined threshold value.

9. The motor control device according to claim 2, wherein the processor is further configured to generate the first preload command so as to maintain the first force constantly, when the operation amount exceeds the threshold value.

10. The motor control device according to claim 1, wherein
    the operation amount is an acceleration of the driven object, the first motor, or the second motor.

11. The motor control device according to claim 1, wherein
    the operation amount is a first torque command for the first motor, which is included in the first operation command.

12. The motor control device according to claim 1, wherein the operation amount is a second torque command for the second motor, which is included in the second operation command.

13. The motor control device according to claim 1, wherein
the processor is further configured to:
determine whether to carry out a profile control to move the driven object toward a target position by the first motor and the second motor while maintaining a state where the drive axis of the first motor and the drive axis of the second motor apply forces in opposite directions to the driven object, and
upon determining the processor not to carry out the profile control,
start a command generation operation to generate the first operation command and the second operation command,
determine whether the operation amount exceeds the threshold value after the start of the command generation operation, and
adjust the first preload command and the second preload command so as to reduce the absolute value when determining that the operation amount exceeds the threshold value.

* * * * *